US012047371B2

(12) United States Patent
Xie

(10) Patent No.: US 12,047,371 B2
(45) Date of Patent: Jul. 23, 2024

(54) MOBILE DEVICE BASED CREDENTIAL AUTHENTICATION

(71) Applicant: Michael Donghui Xie, San Mateo, CA (US)

(72) Inventor: Michael Donghui Xie, San Mateo, CA (US)

(*) Notice: Subject to any disclaimer, the term of this patent is extended or adjusted under 35 U.S.C. 154(b) by 152 days.

(21) Appl. No.: 17/464,669

(22) Filed: Sep. 1, 2021

(65) Prior Publication Data

US 2022/0086134 A1    Mar. 17, 2022

Related U.S. Application Data

(60) Provisional application No. 63/077,010, filed on Sep. 11, 2020.

(51) Int. Cl.
*H04L 29/06* (2006.01)
*H04L 9/40* (2022.01)
*H04L 67/141* (2022.01)

(52) U.S. Cl.
CPC ........ *H04L 63/083* (2013.01); *H04L 63/0414* (2013.01); *H04L 63/0442* (2013.01); *H04L 63/067* (2013.01); *H04L 67/141* (2013.01)

(58) Field of Classification Search
None
See application file for complete search history.

(56) References Cited

U.S. PATENT DOCUMENTS

| | | | |
|---|---|---|---|
| 11,170,363 B1* | 11/2021 | Maeng | G06Q 20/3823 |
| 2014/0068787 A1* | 3/2014 | Steigmann | G06F 21/41 |
| | | | 726/28 |
| 2017/0048252 A1* | 2/2017 | Straub | H04L 67/02 |
| 2018/0285898 A1* | 10/2018 | Sheng | G06K 7/1417 |
| 2019/0386981 A1* | 12/2019 | Ramesh Kumar | H04L 9/3228 |
| 2020/0057706 A1* | 2/2020 | Rome | H04L 63/1425 |
| 2021/0209582 A1* | 7/2021 | Paliwal | G06F 21/31 |

* cited by examiner

*Primary Examiner* — Sanchit K Sarker
(74) *Attorney, Agent, or Firm* — Folio Law Group PLLC

(57) ABSTRACT

Some embodiments provide a method for mobile device based user authentication. The method includes registering a session between a browser and a web application. The method also includes receiving a data object associated with the session and receiving a QR code from a mobile device that is captured from the browser. The method also provides for identifying the data object and sending the data object to the mobile device to retrieve user credentials. The method then receives an encrypted message comprising the user credentials from the mobile device. The encrypted message is then forwarded to the web application for authentication.

17 Claims, 10 Drawing Sheets

MOBILE DEVICE BASED CREDENTIAL AUTHENTICATION

RELATED APPLICATIONS

The present application is a non-provisional application claiming the benefit of U.S. Provisional Application No. 63/077,010, filed Sep. 10, 2020, entitled "MOBILE DEVICE BASED CREDENTIAL AUTHENTICATION.

BACKGROUND

In user login authentication, a user typically provides some form of credentials to the authenticating entity. For example, when a user wishes to access their account in a web application, the user may provide a username and password combination. Often, users select credentials that are weak out of fear of misremembering stronger credentials. Additionally, users often use the same credentials for logging into multiple accounts hosted by multiple web applications. For example, the user may use the same username and password combination for their email, banking, entertainment services, and professional services accounts. Thus, many users may be exposed to credential cracking.

SUMMARY

In some embodiments, a method includes registering, at an authentication server, a session between a browser executing on a computing device and a web application executing on an application server using a quick response (QR) code generated by the web application, the QR code being sent to the computing device for display in response to a user requesting to access the web application via the browser. Next, the method includes receiving, at the authentication server from the web application, a data object associated with the session between the computing device and the web application. Additionally, the method includes receiving, at the authentication server from a mobile device of the user, the QR code as captured by the user using camera of the mobile device. Further, the method includes identifying, using the QR code, the data object and sending the data object to the mobile device, the data object is configured to retrieve user credentials for accessing the web application. Also, the method includes receiving, at the authentication server from the mobile device, an encrypted message comprising the user credentials and forwarding the encrypted message to the computing device for communication to the web application, wherein the web application is configured to authenticate the user credentials and provide the computing device access to the web application.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Figure 1:
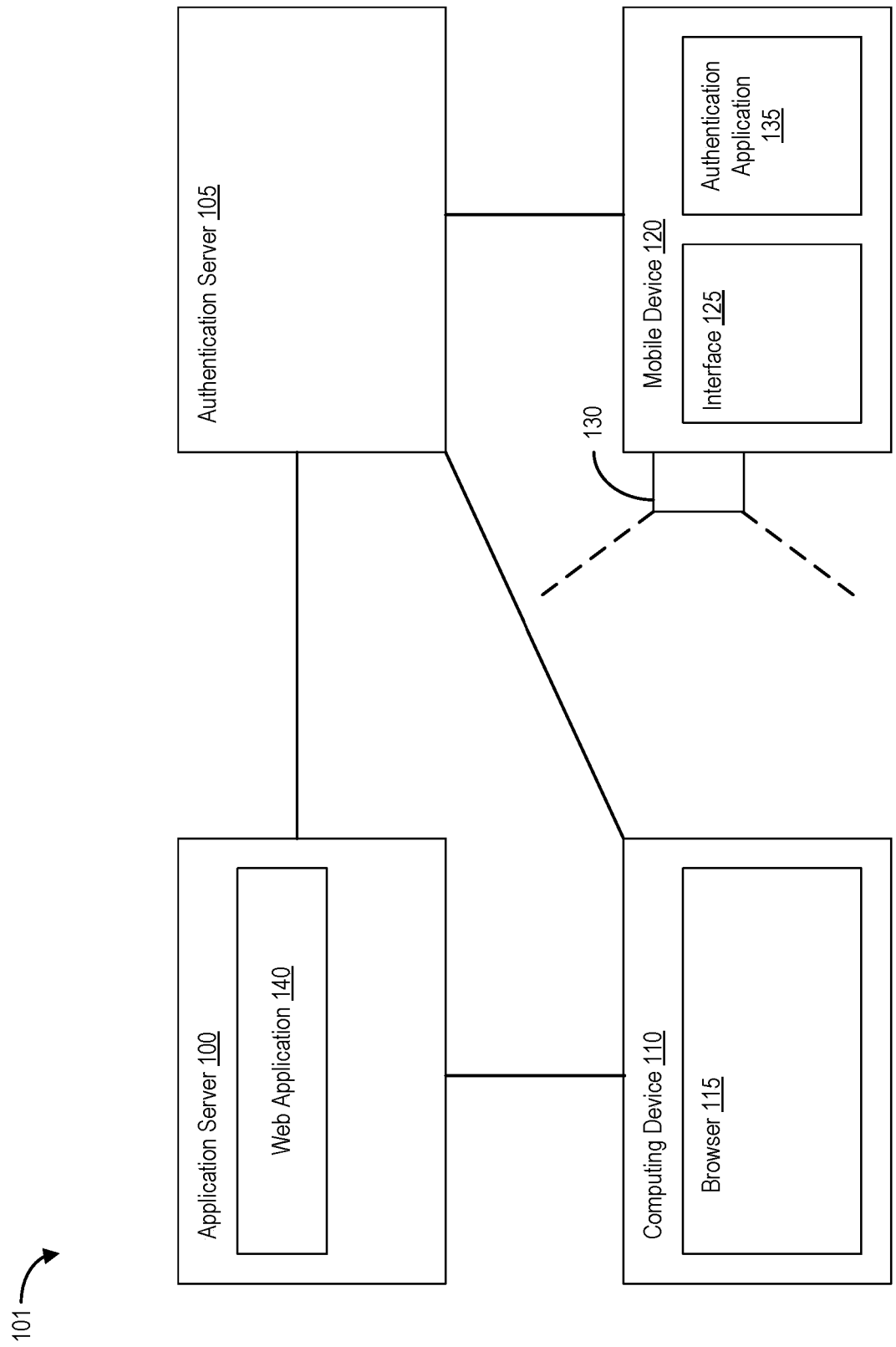
FIG. 1 illustrates a system for authenticating credentials for an application according to some embodiments.

FIG. 1 illustrates a system 101 for authenticating credentials for an application according to some embodiments. As shown, system 101 includes an application server 100, an authentication server 105, a computing device 110, and a mobile device 120. Application server 100 may be any server that hosts applications. For example, application server 100 may host applications related to email, online banking, entertainment, messaging, etc. In the example shown, application server 100 hosts web application 140. Computing device 110 is shown to communicate with application server 100 and authentication server 105. In particular, computing device 110 may access resources hosted on application server 100. A user may interact with such resources via a browser 115. In some embodiments, computing device 110 may be required to provide credentials to application server 100 in order to access certain resources. For example, when computing device 110 visits a webpage hosted by application server 100, application server 100 may direct computing device 110 to a login page. The login page may prompt the user for login credentials, including a username, password, biometric data, among others. Once application server 100 receives such credentials, application server 100 may authenticate the credentials. In some instances, the application server 100 compares the inputted credentials with stored credentials. If there is a match, application server 100 authenticates the inputted credentials. In response, computing device 110 may then be "logged in." As such, application server 100 may send application resources to computing device 110 for interaction via browser 115. In some embodiments, computing device 110 can be a desktop computer, a laptop computer, a tablet, or the like.

Mobile device 120 is shown to be in communication with authentication server 105. Mobile device 120 includes an interface 125, an authentication application 135, and an image capture device 130. The authentication application 135 may be configured to interact with authentication server 105. In some embodiments, the user interacts with authentication application 135 via interface 125. Image capture device 130 may capture images displayed in browser 115 of computing device 110. In some embodiments, mobile device 120 may be a smartphone, smart watch, tablet, or other personal device.

Authentication server 105 is configured to perform authentication services for web application 140. For example, authentication server 105 may receive a request from web application 140 to authenticate a user that accesses web application 140 via computing device 110. In response, authentication server 105 may send a message to mobile device 120 to authenticate the user. The authentication process will be discussed in further detail below.

Figure 2:
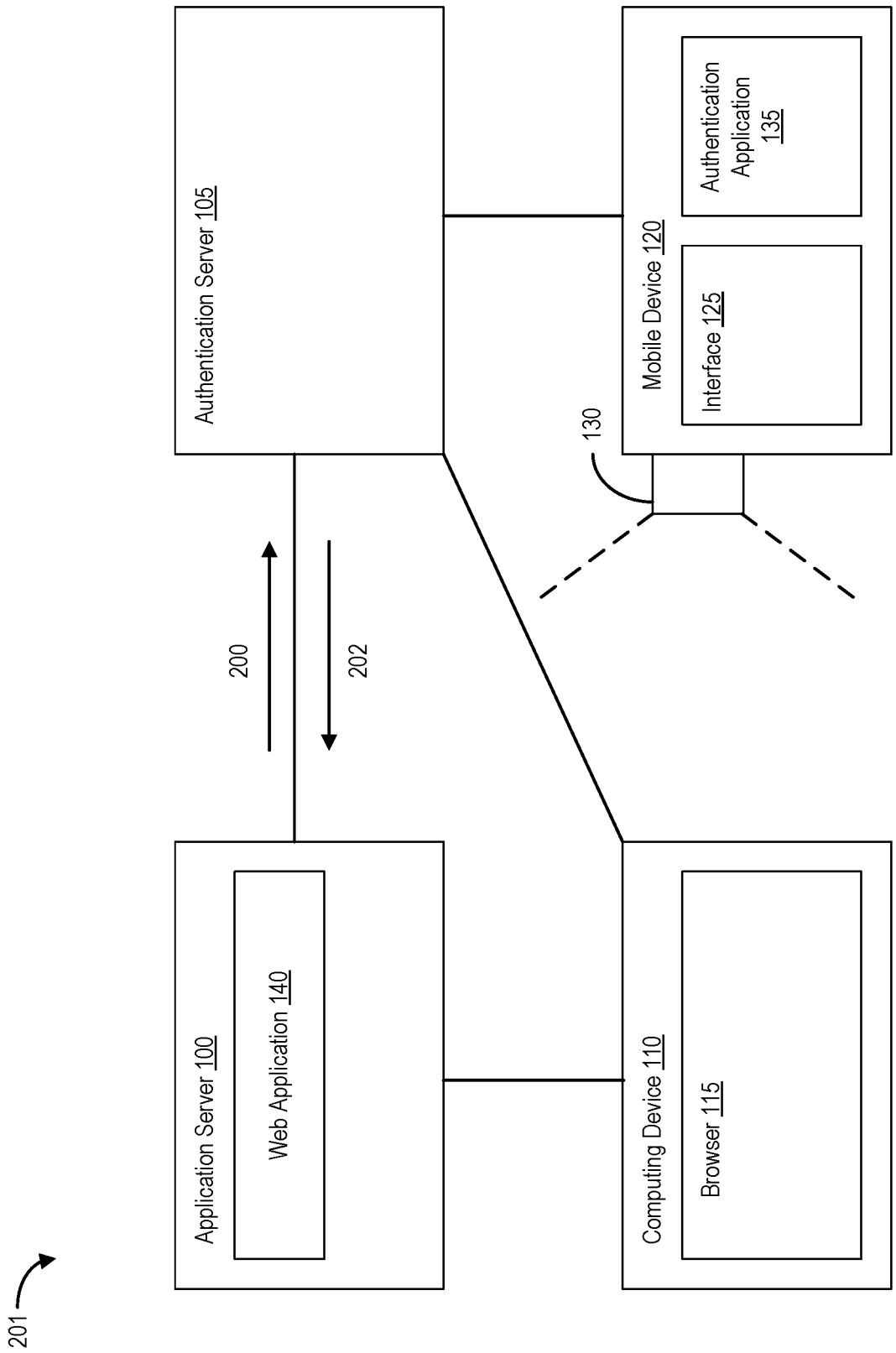
FIG. 2 shows an exemplary process for registering a web application with authentication server according to some embodiments.

FIG. 2 shows an exemplary process 201 for registering web application 140 with authentication server 105 according to some embodiments. In the example shown, web application 140 visits, at 200, authentication server 105 in order to register web application 140 with authentication server 105. In doing so, authentication server 105 may provide authentication services for web application 140. First, web application 140 performs a check with authentication server 105 to determine whether web application 140 has been registered by another entity. If not, web application 140 generates a keypair comprising a private key and a public key. Web application 140 may use the private key to sign an application name associated with web application 140. Web application 140 may send the resulting digital signature and the public key to authentication server 105 to identify this registration. Once authentication server 105 receives the signature and public key, authentication server 105 may then verify the signature. For example, application server 105 may use the public key to decrypt the signature to verify the signature. After verification, authentication server 105 may send, at 202, an acknowledgement message to confirm that web application 140 has been registered.

Figure 3:
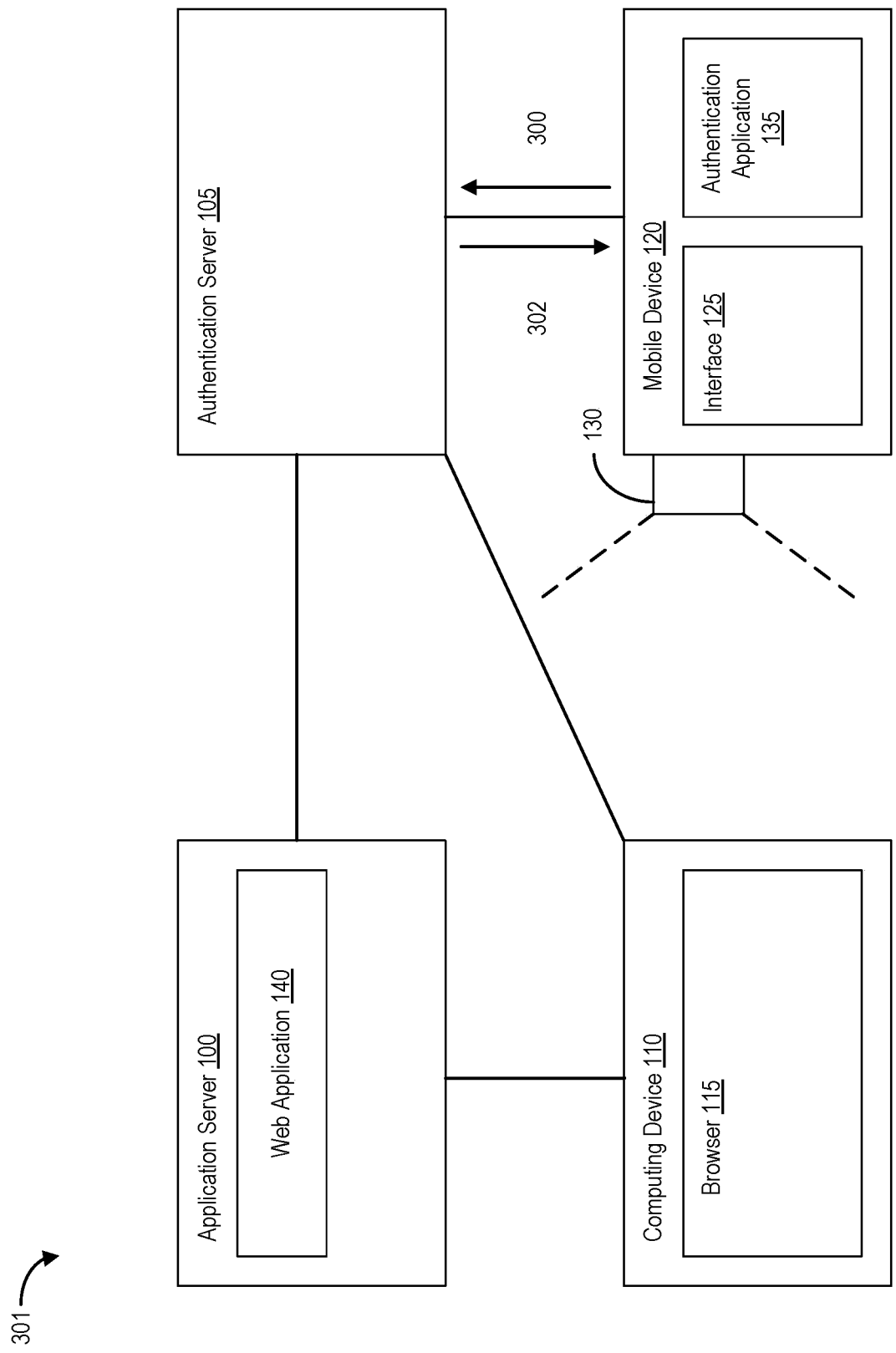
FIG. 3 shows an exemplary process for registering authentication application with authentication server according to some embodiments.

FIG. 3 shows an exemplary process 301 for registering authentication application 135 with authentication server 105 according to some embodiments. In the example shown, a user of mobile device 120 may have downloaded authentication application 135 from an app store. Once downloaded, mobile device 120 may identify a unique installation instance of authentication application 135. Next, mobile device 120 generates a key pair comprising a mobile device private key and a mobile device public key. Mobile device 120 may then use the mobile device private key to sign a message to be sent to authentication server 105. As shown, mobile device 120 sends, at 300, the resulting signature, the mobile device public key, and a device identifier to authentication server 105. Once received by authentication server 105, authentication server 105 may verify that the sender of the message is mobile device 120 and not some other device. Once mobile device 120 is verified, authentication server 105 may send, at 302, and acknowledge message that verification of mobile device 120 is complete. Once verification is complete, the user may enter credentials into authentication application 135. For example, the user may store various usernames and password combinations in authentication application 135.

Figure 4A:
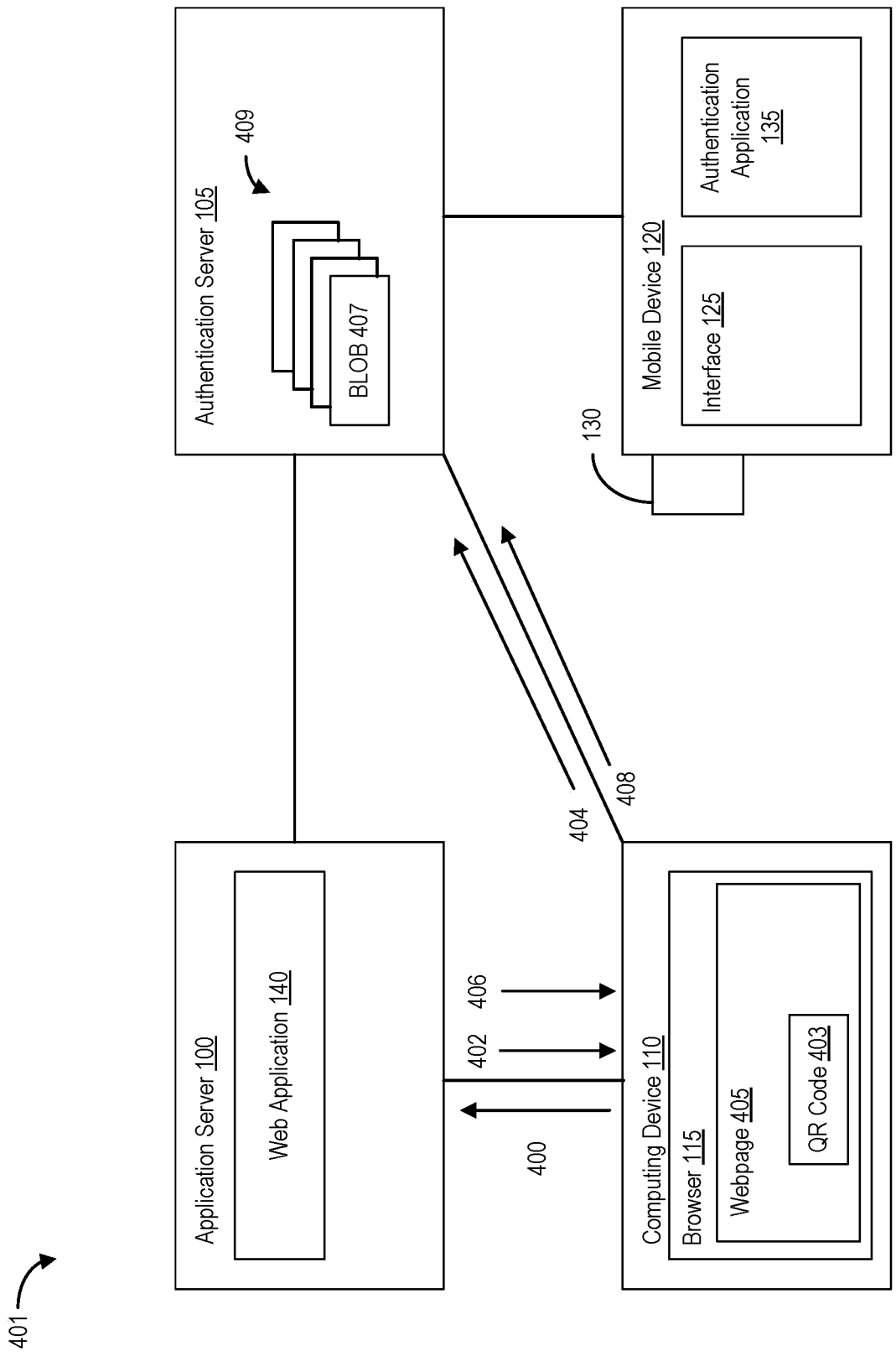
FIGS. 4A-4B shows an exemplary process for authenticating a user of web application via computing device according to some embodiments.
Figure 4B:
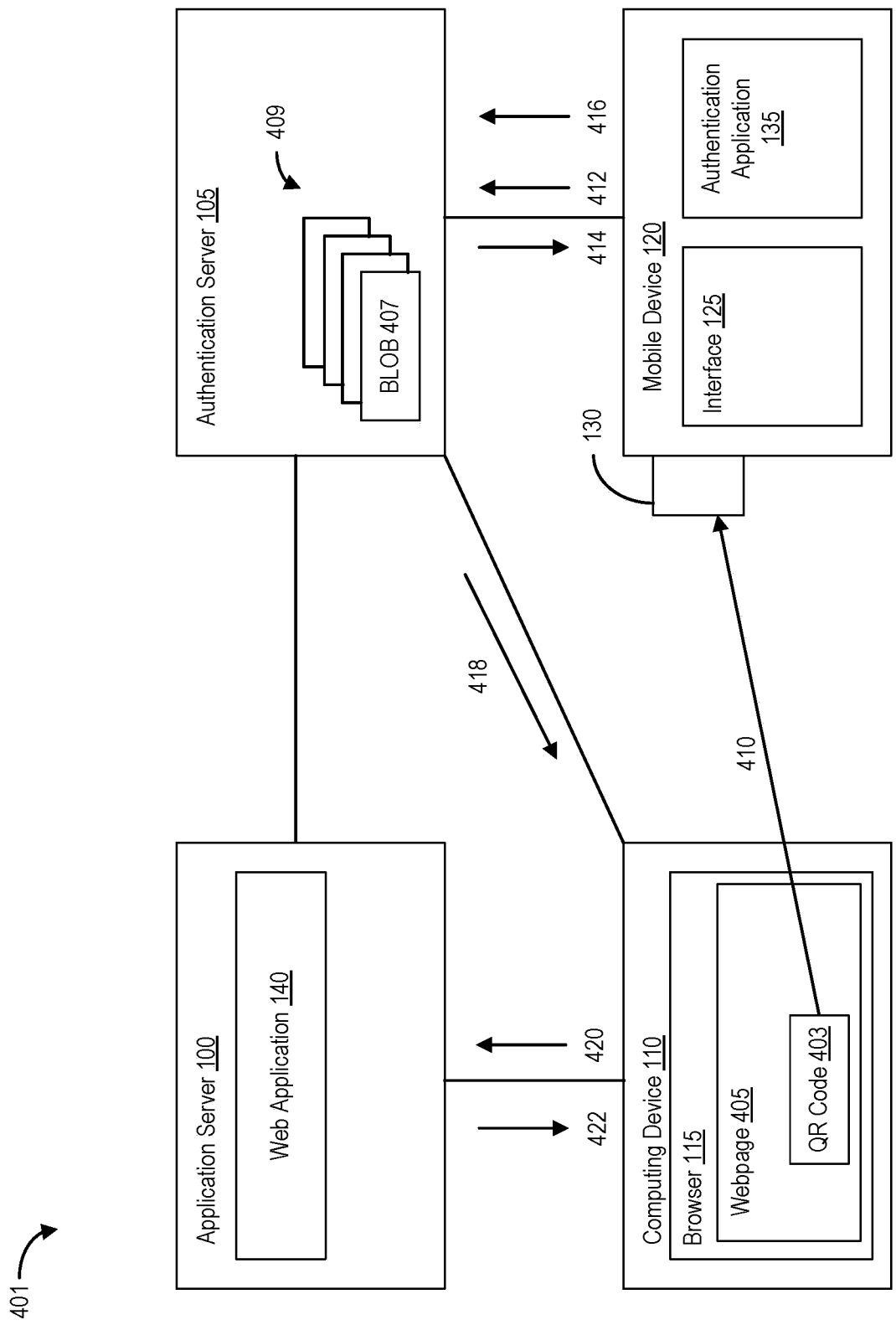

FIGS. 4A-4B show an exemplary process 401 for authenticating a user of web application 140 via computing device 110 according to some embodiments. As shown, the user may visit, at 400, a webpage 405 associated with web application 140 via browser 115. As used herein, this visit by computing device 110 to the webpage associated with web application 140 may be referred to as a session. In response to the request to visit the webpage 405, web application 140 may generate a quick response (QR) code using the private key held by web application 140. Because only web application 140 holds this private key, no other entity may generate this QR code. Once this QR code is generated, web application 140 may send the QR code to computing device 110 for display on browser 115 at 402. In response, computing device 110 displays QR code 403 in browser 115. Additionally, web application 140 generates a session ID and a one-time session key. The session ID and the one-time session key may be communicated to computing device 110 along with the QR code 403 at 402.

Next, webpage 405 registers, at 404, the present session with authentication server 105. Webpage 405 may use the QR code 403 to open a channel with authentication server 105 that uniquely identifies the present session, e.g., the present login page. At any given time, there may be a plurality of users attempting to log in to web application 140. The QR code 403 is able to uniquely identify the session between computing device 110 and web application 140. Once authentication server 105 receives the QR code 403, it may assign a channel ID that uniquely identifies the channel. In some embodiments, the channel ID may be a hash of the QR code 403.

Next, web application 140 generates a BLOB 407 that includes the application name, the session ID, one-time session key, and application authentication requirements. Web application 140 sends BLOB 407 to computing device 110 at 406. In some embodiments, application authentication requirements specify the type of credentials required to grant a user access to web application 140. Web application 140 may sign BLOB 407 using the private key. Once computing device 110 receives BLOB 407, computing device 110 may send, at 408, BLOB 407 to authentication server 105. Authentication server 105 may then wait for communication from mobile device 120. Authentication server 105 may store a plurality of BLOBs associated with different sessions. In some embodiments, application server 105 indexes the plurality of BLOBs according to channel IDs. For example, once authentication server 105 receives BLOB 407, authentication server 105 may associate BLOB 407 with the channel ID that uniquely identifies the login session. Authentication server 105 verifies the authenticity of BLOB 407 by using the public key of the application that was received previously. In other embodiments, authentication server 105 may push the public key to mobile 120 for mobile device 120 to authenticate BLOB 407.

The disclosure will now turn to FIG. 4B. As noted above, QR code 403 is displayed on computing device 110. The user may be prompted to capture QR code 403 using image capture device 130 on mobile device 120. Once QR code 403 is captured, at 410, by mobile device 120, mobile device may send, at 412, QR code 403 to authentication server 105. When authentication server 105 receives the QR code 403 from mobile device 120, authentication server 105 may then derive the channel ID from the QR code 403. By deriving the channel ID from QR code 403, authentication server 105 may then determine which login page, e.g., webpage 405, mobile device 120 is scanning. In certain embodiments, there is a one-to-one matching between the QR code 403 and the channel ID. Authentication server 105 may then use the channel ID to retrieve BLOB 407 and send BLOB 407, at 414, to mobile device 120. As noted above, BLOB 407 includes the application name, the session ID, the one-time session key, and the application authentication requirements.

After mobile device 120 receives BLOB 407, authentication application 135 executing on mobile device 120 may then process BLOB 407. From the standpoint of mobile device 120, BLOB 407 is authentic because authentication server 105 has previously verified the authenticity of BLOB 407. Next, authentication application 135 may determine from the application name in BLOB 407 whether credentials for web application 140 is stored on mobile device 120. For example, if the web application 140 is associated with the application name Wells Fargo, authentication application 135 may determine from this application name whether the user has previously stored credentials for Wells Fargo on mobile device 120. Next, authentication application 135 may prompt the user for approval via interface 125. In response to this, the user may approve of the request for approval via interface 125.

When the approval is received by authentication application 135, authentication application 135 generates a response that includes the previously stored credentials on mobile device 120. In addition to the previously stored credentials, the response may also include the one-time session key that was previously sent by web application 140 in BLOB 407. Authentication application 135 may encrypt the response using the public key of web application 140. Next, mobile device sends, at 416, the encrypted response to authentication server 105. When authentication server 105 receives the encrypted response, authentication server 105 forwards, at 418, the encrypted response to webpage 405 on computing device 110. Authentication server 105 may use the channel ID to determine that computing device 110 is the proper recipient of the encrypted response. Authentication server 105 does not decrypt the encrypted response received by authentication application 135. Then, webpage 405 may forward the encrypted response, at 420, to web application 140. Web application 140 may then process the encrypted response.

Web application 140 is configured to decrypt the encrypted response using its private key. No other entity can decrypt this encrypted response because web application 140 is the only entity that holds the private key. As a result, the previously stored user credentials contained in the response is not exposed to other entities. For example, authentication server 105 cannot decrypt this encrypted response because it does not have the private key. Next, web application 140 uses the one-time session key to identify the session between computing device 110 and web application 140. In some embodiments, the session ID acts as the one-time session key to identify the particular session between computing device and web application 140. Next, web application 140 verifies the previously stored user credentials contained within the encrypted response against its own database. For example, web application 140 may check whether the received username and password matches one that is stored in its database. In response to a match, web application 140 completes the login process and grants computing device 110 access to resources. For example, web application 140 sends, at 422, resources associated with web application 140 to computing device 110.

Figure 5:
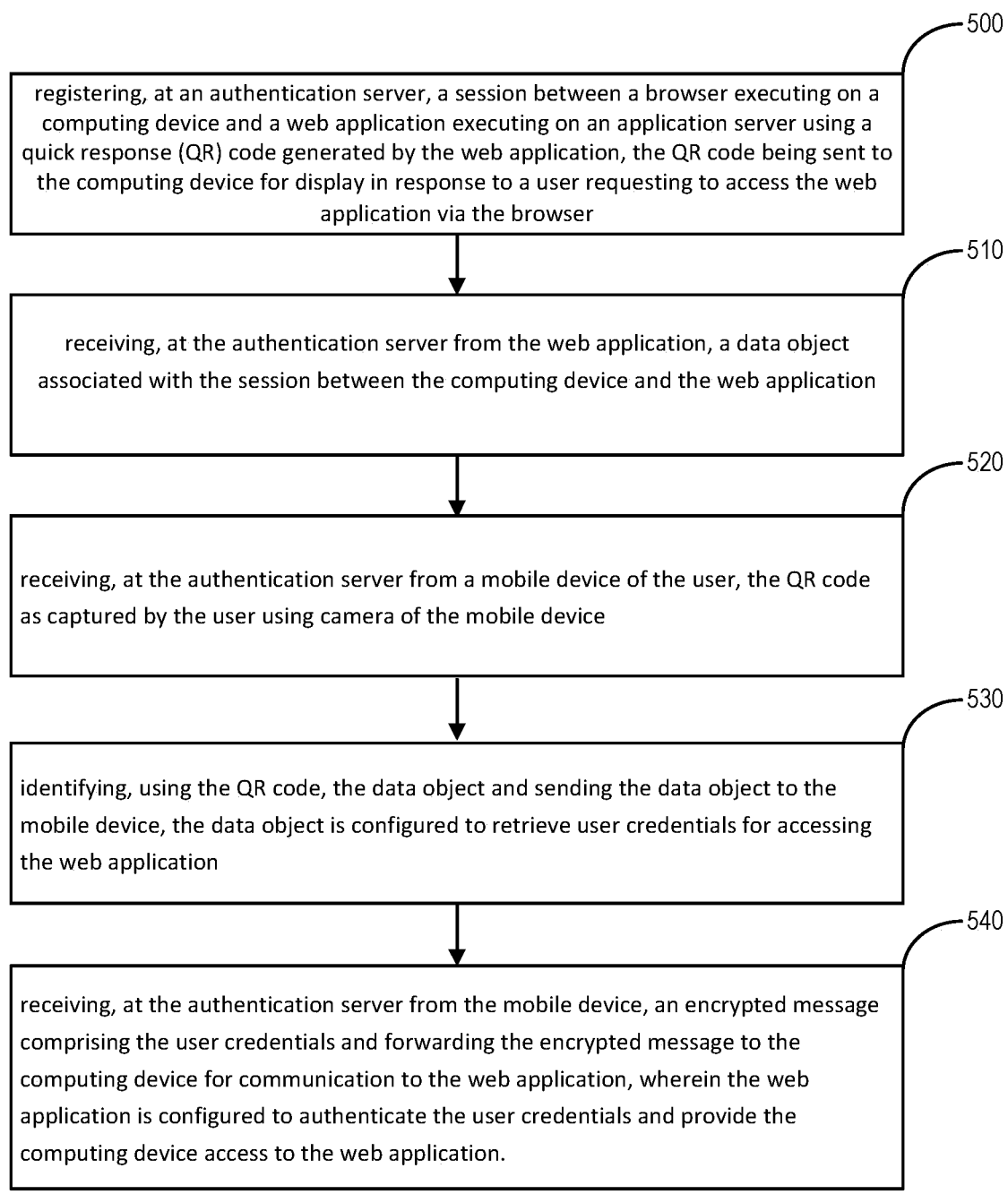
FIG. 5 shows an overall flow of method for performing mobile device based credential authentication, according to one embodiment.

FIG. 5 shows an overall flow of method for performing mobile device based credential authentication, according to one embodiment. At step 500, the method provides for registering, at an authentication server, a session between a browser executing on a computing device and a web application executing on an application server using a quick response (QR) code generated by the web application, the QR code being sent to the computing device for display in response to a user requesting to access the web application via the browser. At step 510, the method provides for receiving, at the authentication server from the web application, a data object associated with the session between the computing device and the web application. At step 520, the method provides for receiving, at the authentication server from a mobile device of the user, the QR code as captured by the user using camera of the mobile device. At step 530, the method provides for identifying, using the QR code, the data object and sending the data object to the mobile device, the data object is configured to retrieve user credentials for accessing the web application. Further, at step 540, the method provides for receiving, at the authentication server from the mobile device, an encrypted message comprising the user credentials and forwarding the encrypted message to the computing device for communication to the web application, wherein the web application is configured to authenticate the user credentials and provide the computing device access to the web application.

Figure 6A:
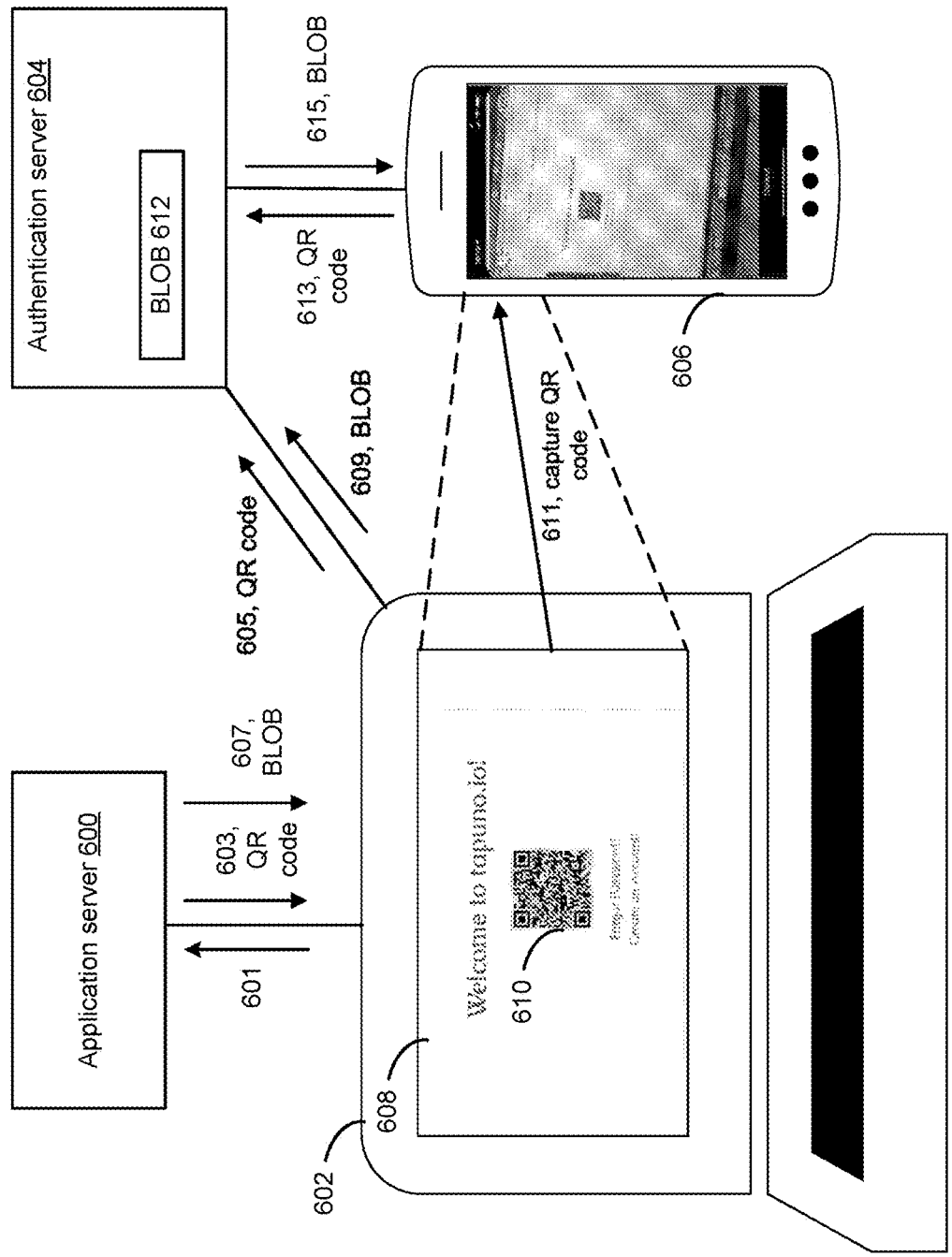
FIGS. 6A-6D illustrates different stages for mobile device based credential authentication, according to some embodiments.

FIGS. 6A-6D illustrates different stages for mobile device based credential authentication, according to some embodiments. In FIG. 6A, a user of laptop 602 visits "tapuno.io" via browser to access the website at 601. In response, the application server 600 sends a login page 608 and QR code 610 for display at 603. At 605, laptop 602 sends QR code 610 to authentication server. Next, at 607, application server 600 sends BLOB 612 to laptop 602. As noted above, BLOB 612 may include an application name, a session ID, a one-time session key, and authentication requirements. In this example, the authentication requirements may include second factor, which may be a pin code or other biometric information, such as facial recognition. At 609, laptop 602 sends BLOB 612 to authentication server. In response, authentication server stores BLOB 612 and waits for communication from mobile device 606.

At 611, the user of mobile device 606 captures QR code 610 using a camera. In some embodiments, QR code 610 initiates an authentication application installed on mobile device 606. Next, at 613, mobile device 606 sends QR code 610 to authentication server 604. In response, authentication server 604 identifies BLOB 612 to send to mobile device 606. At 615, authentication server 604 sends BLOB 612 to mobile device 606.

Figure 6B:
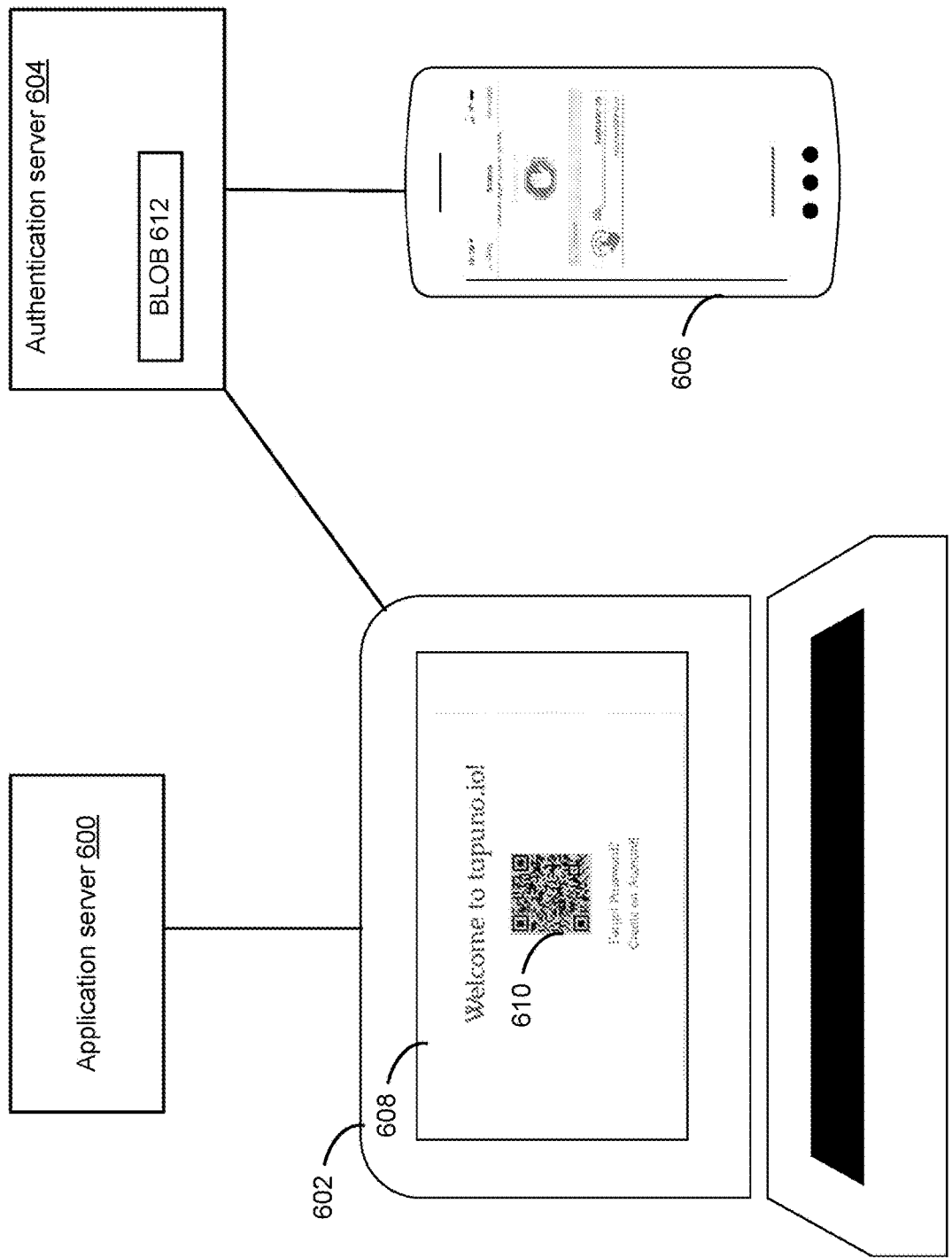

In FIG. 6B, mobile device 606 processes BLOB 612 and figures out which application is requesting user credentials. Here, mobile device 606 determines that "tapuno.io" is the requesting application and looks up whether the user has previously stored user credentials for "tapuno.io" on mobile device 606, e.g., within the authentication application. Mobile device 606 determines that the user has indeed previously stored user credentials (e.g., user name and password) for "tapuno.io." Next, mobile device 606 prompts the user for approval to send application server 600 the stored user credentials for "tapuno.io."

Figure 6C:
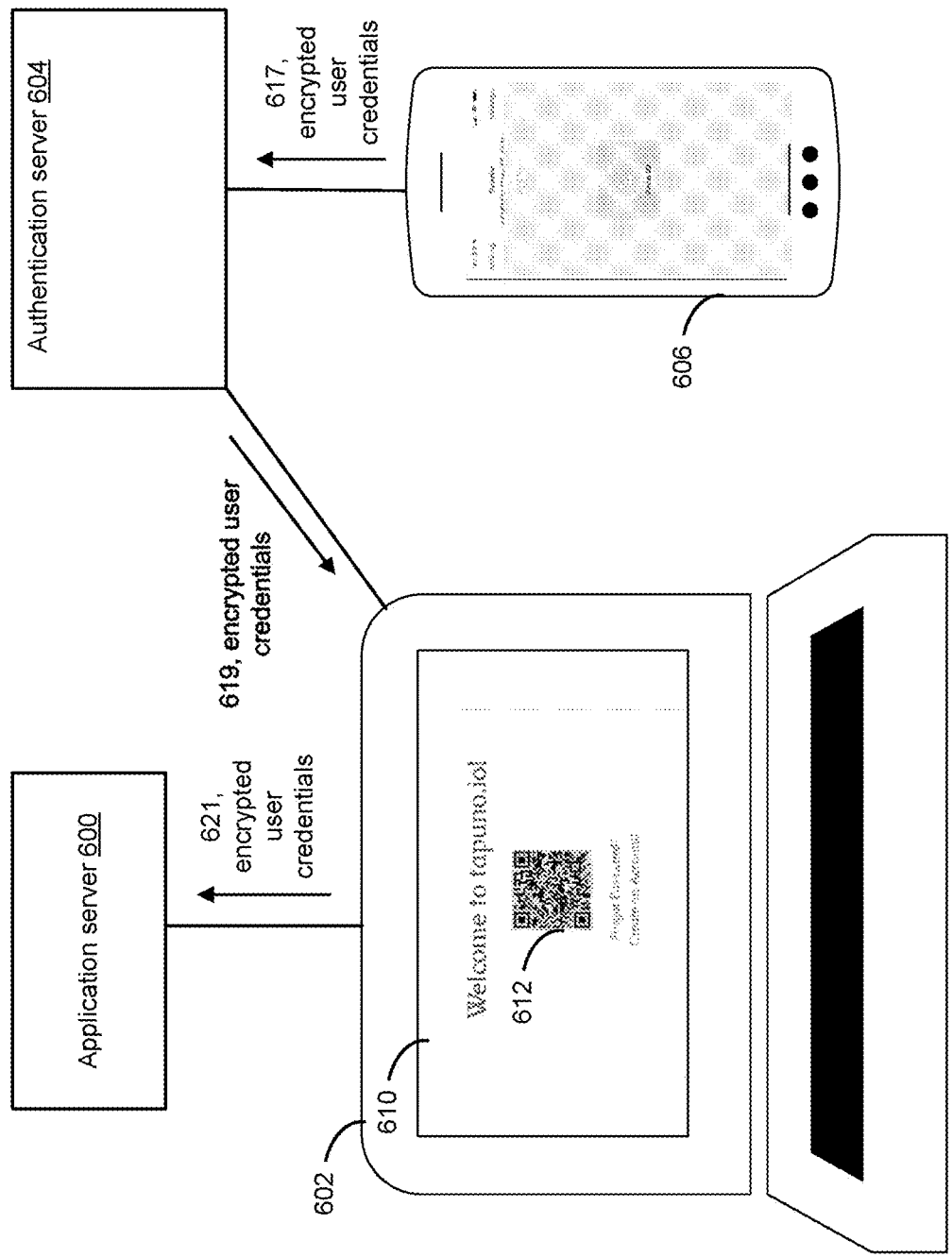

In FIG. 6C, mobile device 606 performs facial recognition on the user and authenticates the user. In response, mobile device 606 encrypts the user credentials for "tapuno.io" and sends the encrypted user credentials to authentication server at 617. In some embodiments, mobile device 606 user a private key to encrypt the user credentials. Authentication server 604 then sends the encrypted user credentials to laptop 602. Authentication server 604 does not decrypt the user credentials because it does not have a key to do so. Once laptop 602 receives the encrypted user credentials, it forwards the user credentials to application server 600.

Figure 6D:
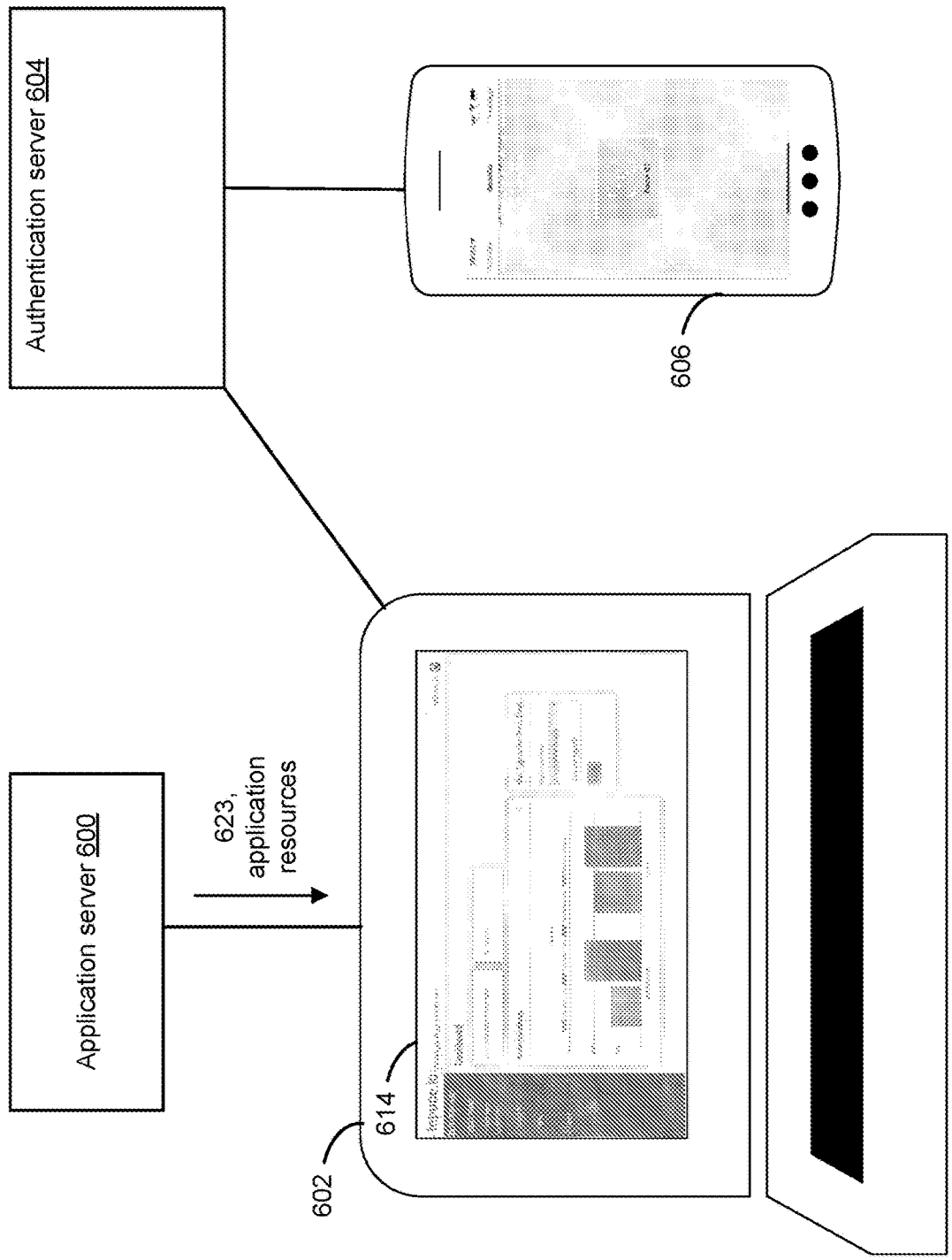

In FIG. 6D, application server 600 decrypts the user credentials and authenticates the user credentials. After authenticating the user credentials, application server 600 sends, at 623, the application resources 614 to laptop 602 for display.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A method comprising:
registering, at an authentication server, a session between a browser executing on a computing device and a web application executing on an application server using a quick response (QR) code generated by the web application, the QR code being sent to the computing device for display in response to a user requesting to access the web application via the browser;
receiving, at the authentication server from the web application, a data object associated with the session between the computing device and the web application;
receiving, at the authentication server from a mobile device of the user, the QR code as captured by the user using camera of the mobile device;
identifying, using the QR code, the data object and sending the data object to the mobile device, the data object is configured to retrieve user credentials for accessing the web application; and
receiving, at the authentication server from the mobile device, and encrypted message comprising the user credentials and forwarding the encrypted message to the computing device for communication to the web application, wherein the web application is configured to authenticate the user credentials and provide the computing device access to the web application;
wherein the web application decrypts the encrypted message to authenticate the user credentials and wherein the authentication server does not decrypt the encrypted message.

2. The method of claim 1, wherein the QR code is generated by the web application using a private key of the web application.

3. The method of claim 1, further comprising:
assigning, by the authentication server, a channel ID to the QR code received from the computing device;
indexing, by the authentication server, the received data object to the channel ID assigned to the received QR code; and
in response to receiving the QR from the mobile device, deriving, by the authentication server, the channel ID from the QR code received from the mobile device;
wherein the data object is identified based the channel ID.

4. The method of claim 1, wherein the data object is a binary large object (BLOB) comprising an application name associated with the web application, a session ID associated with the session, and a one-time session key.

5. The method of claim 4, wherein the BLOB further comprises authentication requirements for the user to provide via the mobile device, the authentication requirements including one or more of a facial recognition, a voice recognition, a fingerprint, or a password.

6. The method of claim 4, wherein the BLOB is signed by the web application using the private key, the BLOB being verified by the authentication server using a public key.

7. A non-transitory machine-readable medium storing a program executable by at least one processor of a computing device, the program comprising sets of instructions for:
registering, at an authentication server, a session between a browser executing on a computing device and a web application executing on an application server using a quick response (QR) code generated by the web application, the QR code being sent to the computing device for display in response to a user requesting to access the web application via the browser;
receiving, at the authentication server from the web application, a data object associated with the session between the computing device and the web application;
receiving, at the authentication server from a mobile device of the user, the QR code as captured by the user using camera of the mobile device;
identifying, using the QR code, the data object and sending the data object to the mobile device, the data object is configured to retrieve user credentials for accessing the web application; and
receiving, at the authentication server from the mobile device, and encrypted message comprising the user credentials and forwarding the encrypted message to the computing device for communication to the web application, wherein the web application is configured to authenticate the user credentials and provide the computing device access to the web application;
wherein the web application decrypts the encrypted message to authenticate the user credentials and wherein the authentication server does not decrypt the encrypted message.

8. The non-transitory machine-readable medium of claim 7, wherein the QR code generated by the web application using a private key of the web application.

9. The non-transitory machine-readable medium of claim 7, further comprising:
assigning, by the authentication server, a channel ID to the QR code received from the computing device;
indexing, by the authentication server, the received data object to the channel ID assigned to the received QR code; and
in response to receiving the QR from the mobile device, deriving, by the authentication server, the channel ID from the QR code received from the mobile device;
wherein the data object is identified based the channel ID.

10. The non-transitory machine-readable medium of claim 7, wherein the data object is a binary large object (BLOB) comprising an application name associated with the web application, a session ID associated with the session, and a one-time session key.

11. The non-transitory machine-readable medium of claim 10, wherein the BLOB further comprises authentication requirements for the user to provide via the mobile device, the authentication requirements including one or more of a facial recognition, a voice recognition, a fingerprint, or a password.

12. The non-transitory machine-readable medium of claim 10, wherein the BLOB is signed by the web application using the private key, the BLOB being verified by the authentication server using a public key.

13. A system comprising:
a set of processors; and
a non-transitory machine-readable medium storing instructions that when executed by at least one processor in the set of processors cause the at least one processor to:
register, at an authentication server, a session between a browser executing on a computing device and a web application executing on an application server using a quick response (QR) code generated by the web application, the QR code being sent to the computing device for display in response to a user requesting to access the web application via the browser;
receive, at the authentication server from the web application, data object associated with the session between the computing device and the web application;

receive, at the authentication server from a mobile device of the user, the QR code as captured by the user using camera of the mobile device;

identify, using the QR code, the data object and sending the data object to the mobile device, the data object is configured to retrieve user credentials for accessing the web application; and receive, at the authentication server from the mobile device, an encrypted message comprising the user credentials and forwarding the encrypted message to the computing device for communication to the web application, wherein the web application is configured to authenticate the user credentials and provide the computing device access to the web application;

wherein the web application decrypts the encrypted message to authenticate the user credentials and wherein the authentication server does not decrypt the encrypted message.

14. The system of claim 13, further comprising:

assigning, by the authentication server, a channel ID to the QR code received from the computing device;

indexing, by the authentication server, the received data object to the channel ID assigning to the received QR; and in response to receiving the QR from the mobile device, deriving, by the authentication server, the channel ID from the QR code received from the mobile device;

wherein the data object is identified based the channel ID.

15. The system of claim 13, wherein the data object is a binary large object (BLOB) comprising an application name associated with the web application, a session ID associated with the session, and a one-time session key.

16. The system of claim 15, wherein the BLOB further comprises authentication requirements for the user to provide via the mobile device, the authentication requirements including one or more of a facial recognition, a voice recognition, a fingerprint, or a password.

17. The system of claim 12, wherein the user credentials is only stored on the mobile device of the user and the mobile device only sends the user credentials to the authentication server in response to approval by the user.

* * * * *